(12) United States Patent
Nefcy et al.

(10) Patent No.: US 9,616,881 B2
(45) Date of Patent: Apr. 11, 2017

(54) SYSTEM AND METHOD OF CONTROLLING A POWERTRAIN

(71) Applicant: FORD GLOBAL TECHNOLOGIES, LLC, Dearborn, MI (US)

(72) Inventors: Bernard D. Nefcy, Novi, MI (US); Daniel Scott Colvin, Farmington Hills, MI (US); Marvin Paul Kraska, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 124 days.

(21) Appl. No.: 14/719,699

(22) Filed: May 22, 2015

(65) Prior Publication Data

US 2016/0339906 A1   Nov. 24, 2016

(51) Int. Cl.
```
B60W 20/00    (2016.01)
B60W 20/30    (2016.01)
B60W 20/40    (2016.01)
F16H 61/16    (2006.01)
F16H 59/18    (2006.01)
F16H 59/44    (2006.01)
F16H 59/54    (2006.01)
F16H 59/56    (2006.01)
B60K 6/48     (2007.10)
```
(52) U.S. Cl.
CPC ............ B60W 20/30 (2013.01); B60K 6/48 (2013.01); B60W 20/40 (2013.01); F16H 59/18 (2013.01); F16H 59/44 (2013.01); F16H 59/54 (2013.01); F16H 59/56 (2013.01); F16H 61/16 (2013.01); *Y10S 903/945* (2013.01)

(58) Field of Classification Search
CPC ....... B60W 20/40; B60W 20/30; F16H 61/16; F16H 59/18; Y10S 903/945
See application file for complete search history.

(56) References Cited

U.S. PATENT DOCUMENTS

| | | | |
|---|---|---|---|
| 7,532,968 B2 | 5/2009 | Kadota | |
| 7,676,313 B2 | 3/2010 | Ortmann et al. | |
| 7,908,063 B2 | 3/2011 | Sah | |
| 9,266,523 B2* | 2/2016 | Ideshio | B60W 20/00 |
| 2013/0297162 A1 | 11/2013 | Dai et al. | |
| 2016/0009273 A1* | 1/2016 | Nagamine | F16H 61/0031 180/65.25 |
| 2016/0059845 A1* | 3/2016 | Nefcy | B60W 20/30 477/115 |
| 2016/0280205 A1* | 9/2016 | Nefcy | B60W 20/13 |

* cited by examiner

*Primary Examiner* — Sherry Estremsky
(74) *Attorney, Agent, or Firm* — David B. Kelley; Brooks Kushman P.C.

(57) ABSTRACT

A vehicle and a method of controlling a powertrain are provided. The vehicle may include a controller programmed to operate a powertrain in a hybrid mode. The controller may be further programmed to, responsive to a request to operate the powertrain in electric mode, transition powertrain operation from the hybrid mode to the electric mode without shifting gears until a change in accelerator pedal position exceeds a threshold following the transition.

17 Claims, 5 Drawing Sheets

SYSTEM AND METHOD OF CONTROLLING A POWERTRAIN

TECHNICAL FIELD

The present disclosure relates to techniques for controlling a powertrain and scheduling transmission shifts.

BACKGROUND

Vehicles may be provided with a transmission designed to operate at a discrete number of fixed speed ratios. The available speed ratios may be referred to as gears or gear ratios even if there is not a direct correspondence between each ratio and a particular physical gear within the transmission. The ratios are typically numbered starting from the highest speed ratio and progressing to lower speed ratios. For example, 1st gear may have a speed ratio of 4.5, 2nd gear a speed ratio of 3.0, 3rd gear a speed ratio of 2.3, etc. At low vehicle speeds, the transmission is usually operated at a high speed ratio such that the transmission multiplies the engine torque for improved acceleration. At high vehicle speeds, the transmission is usually operated at a low speed ratio that permits an engine speed associated with quiet, fuel efficient cruising.

A particular speed ratio from the set of available speed ratios may be selected by engaging particular shift elements such as clutches, brakes, or the like. Shift elements may include actively controlled devices and passively controlled devices like one way clutches. When the currently selected speed ratio is not optimal, the transmission shifts to a different speed ratio by releasing one or more shift elements and engaging one or more shift elements. For example, if the currently selected speed ratio results in an engine speed that is higher than an optimal or efficient engine speed, the transmission may upshift to a lower speed ratio. On the other hand, if the currently selected speed ratio results in an engine speed that is less than optimal or efficient engine speed, the transmission may downshift to a higher speed ratio. During the shift, vehicle occupants may notice variations in output torque and may notice changes in the engine sound.

Modern automatic transmissions utilize controllers both to decide when to shift and to control the shift elements to accomplish the shift as smoothly as possible. Sometimes, a controller schedules a shift event in direct response to an action performed by the driver such as an abrupt change in accelerator pedal position. In these circumstances, the driver may expect that the transmission will shift and will be pleased to feel a shift. At other times, a controller schedules a shift event due to a gradual change in vehicle speed or pedal position. When a vehicle is cruising over level terrain at a steady speed, vehicle occupants expect the transmission to remain in the currently selected gear.

SUMMARY

A vehicle may include an engine, a transmission, and a controller. The transmission may be configured to be selectively coupled to the engine. The controller may be programmed to, responsive to a request to decouple the engine from the transmission received while a traction battery state of charge is greater than a threshold state of charge, to a decrease in vehicle speed less than a threshold decrease, and to an accelerator pedal position being within a predetermined range, command the transmission to maintain a current gear ratio. The current gear ratio may be maintained such that following decoupling of the engine from the transmission, the transmission does not shift while the vehicle speed remains substantially constant and the traction battery state of charge remains greater than the threshold state of charge.

A vehicle may include a controller programmed to operate a powertrain in a hybrid mode. The controller may be further programmed to responsive to a request to operate the powertrain in electric mode, transition powertrain operation from the hybrid mode to the electric mode without shifting gears until a change in accelerator pedal position exceeds a threshold following the transition.

A method of controlling a powertrain may include operating the powertrain in a hybrid mode at a first gear ratio. The method may further include, responsive to a request to operate the powertrain in an electric mode associated with an accelerator pedal tip-out while a traction battery state of charge (SOC) is greater than a threshold SOC, transition operation from the hybrid mode to the electric mode while maintaining the first gear ratio until an accelerator pedal position changes.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
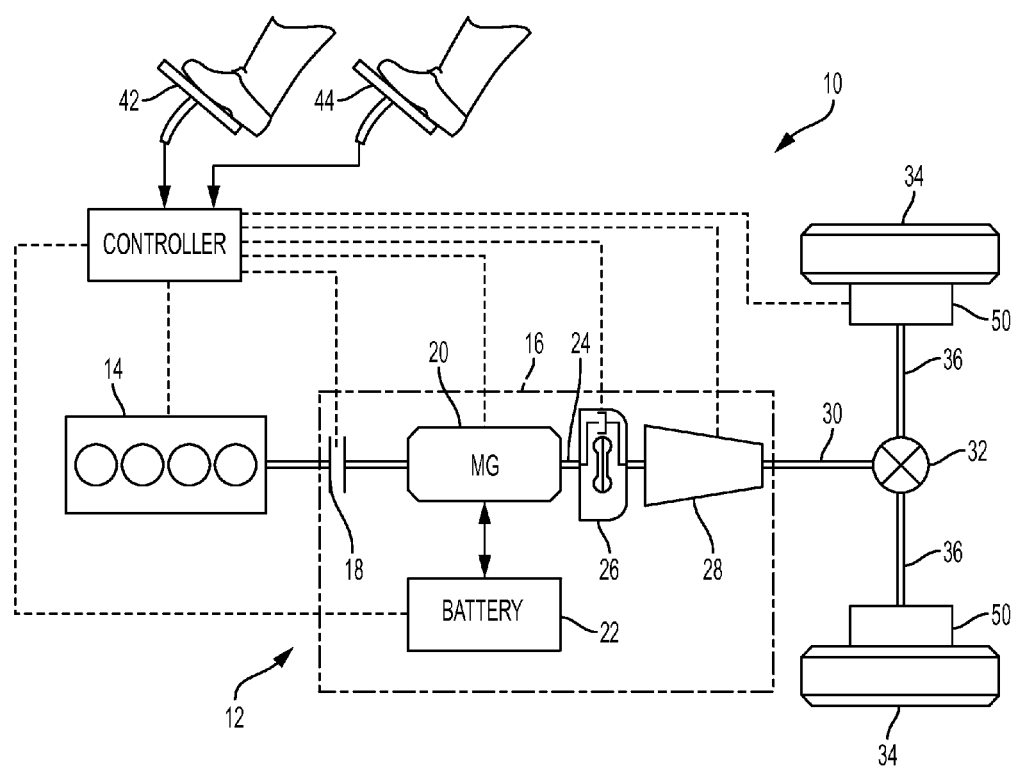
FIG. 1 is a schematic representation of a hybrid vehicle powertrain including a discrete ratio transmission.

Referring to FIG. 1, a schematic diagram of a vehicle 10 is illustrated according to an embodiment of the present disclosure. Physical placement and orientation of the components within the vehicle may vary. Although the powertrain of FIG. 1 will be particularly described, the strategies in accordance with embodiments of the present disclosure may apply to other powertrain configurations.

The vehicle 10 may include a powertrain 12. The powertrain 12 may include an engine 14 operatively coupled to a transmission 16. The engine 14 may be configured to drive the transmission 16. As will be described in further detail below, the transmission 16 may include a disconnect clutch 18, an electric machine such as an electric motor/generator (M/G) 20, an associated traction battery 22, a transmission input shaft 24, a launch clutch or torque converter 26, and a multiple step-ratio automatic transmission, or transmission gear box 28.

The engine 14 may be selectively coupled to the M/G 20 via the disconnect clutch 18. The engine 14 and the M/G 20 may both be capable of providing motive power for the vehicle 10 by providing torque to the transmission gear box 28.

The disconnect clutch 18 may disengage to decouple the engine 14 from the remainder of the powertrain 12 such that the M/G 20 may operate as the sole drive source for the vehicle 10. Power flow from the engine 14 to the M/G 20 or from the M/G 20 to the engine 14 is possible when the disconnect clutch 18 is at least partially engaged. For example, when the disconnect clutch 18 is engaged, the M/G 20 may operate as a generator to convert rotational energy provided by a crankshaft through the M/G 20 into electrical energy to be stored by the traction battery 22.

The M/G 20 may be implemented by any one of a plurality of types of electric machines. For example, M/G 20 may be a permanent magnet synchronous motor. Power electronics may condition direct current power provided by the traction battery 22 to the requirements of the M/G 20. For example, power electronics may provide three phase alternating current to the M/G 20.

A transmission output shaft 30 may be connected to a differential 32. The differential 32 may drive a pair of wheels 34 via axles 36 connected to the differential 32. The differential 32 may transmit torque to each wheel 34 while permitting slight speed differences such as when the vehicle 10 turns or corners.

Different types of differentials or similar devices may be used to distribute torque from the powertrain to one or more wheels. In some applications, torque distribution may vary depending on the particular operating mode or condition, for example.

The transmission 16 may be configured as a step-ratio transmission using multiple friction elements for transmission gear ratio shifting. The transmission 16 may be configured to produce multiple forward and reverse gears via multiple gearing elements within the transmission gear box 28.

The transmission gear box 28 may include a plurality of gear sets (not shown) that are selectively placed in different gear ratios by the selective engagement of friction elements such as shift elements including clutches having clutch elements, and brakes (not shown). The different gear ratios provided by the gear sets may establish multiple drive ratios that may correspond to different overall transmission gear ratios.

A controller 40 may be provided and configured to control the friction elements of the transmission 16, more specifically the transmission gear box 28. The controller 40 may be provided with a transmission shift schedule. The transmission shift schedule may determine the operating conditions or the timing of transmission gear ratio changes via the connection and/or disconnection of friction elements of the gear sets within the transmission gear box 28. The transmission shift schedule may determine the transmission gear ratio changes based on vehicle acceleration, vehicle speed, engine speed, motor generator speed, powertrain torque/power, or a driver request provided by an accelerator pedal 42, a brake pedal 44, or a gear selector.

The controller 40 may be configured to dictate the operational states of the vehicle 10 or the powertrain 12 in addition to the transmission shift schedules. In at least one embodiment, a larger control system may include several controllers. The individual controllers, or the control system, may be influenced by various other controllers throughout the vehicle 10 in which a vehicle system controller (VSC) operates at a higher hierarchy relative to other subservient controllers. The VSC output may directly or indirectly dictate or influence a number of vehicle functions such as starting/stopping the engine 14, operating the M/G 20 to provide wheel torque or recharge the traction battery 22 or start the engine 14, selecting or scheduling transmission gear shifts, etc.

For example, the VSC may receive data from and issue commands to a transmission control module (TCM) that is in direct communication with components of the transmission 16. Examples of other subservient controllers that may operate lower in a controller hierarchy compared to the VSC include a brake system control module (BSCM), a high voltage battery energy control module (BECM), as well as other controllers that are responsible for various vehicle functions. The VSC may further operate to verify data received from other controllers.

Any of the above-mentioned controllers may further include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The VSC and other controllers communicate with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. The VSC may communicate signals to and/or from the TCM. Additionally, the VSC may communicate with other vehicle controllers as discussed above, or directly with vehicle sensors and/or components including the engine 14, the power electronics.

Although not explicitly illustrated, those of ordinary skill in the art will recognize various functions or components that may be controlled by the VSC within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 18, torque converter bypass clutch, and transmission gear box 28, and the like.

Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 18, launch clutch, and transmission gear box 28, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch status (TCC), deceleration or shift mode (MDE), for example. The controller 40 may be provided with control logic configured to operate the powertrain 12. The control logic may control the amount of torque provided to the wheels 34 by controlling a transmission gear ratio between the transmission input shaft 24 and the transmission output shaft 30 based on driver requests. The driver request may be a gear selection (PRNDL) input through a gear selector, accelerator pedal position input through an accelerator pedal 42, brake pedal position input through a brake pedal 44, traction battery temperature, traction battery voltage, traction battery current, and traction battery state of charge (SOC).

The controller 40 may interpret the driver request from the accelerator pedal 42, to determine a driver's intention for demanded powertrain torque or power to propel the vehicle 10. The controller 40 may allocate torque split commands between the engine 14 and/or the M/G 20 to satisfy the driver request. In general, depressing and releasing the accelerator pedal 42 may generate an accelerator pedal position signal that may be interpreted by the controller 40 as a demand for increased power/torque or decreased power/torque, respectively to propel the vehicle 10.

The controller 40 may interpret the driver request from the brake pedal 44, to determine a driver's intention for braking torque to reduce vehicle speed or stop the vehicle 10. The controller 40 may allocate braking torque between a friction braking system 50 and the powertrain 12 through regenerative braking. In general, depressing and releasing the brake pedal 44 may generate a brake pedal position signal that may be interpreted by the controller 40 as a demand for brake torque or decreased power/torque, to reduce vehicle speed or stop the vehicle 10. Based at least upon input from the accelerator pedal 42 or the brake pedal 44, the controller 40 may operate the powertrain 12 in various modes to satisfy the driver request.

The controller 40 may be configured to operate the powertrain 12 in a first mode. The disconnect clutch 18 may be at least partially engaged to operatively couple the engine 14 to the M/G 20, while the powertrain 12 is operating in the first mode. The coupling may transfer a portion of the engine torque through the disconnect clutch 18 to the M/G 20, and then from the M/G 20 through the torque converter 26 and transmission gear box 28. Combustion in the engine 14 may be enabled or otherwise ON during the first mode.

The controller 40 may issue commands to power electronics such that the M/G 20 may assist the engine 14 by providing additional torque to the transmission input shaft 24, in the first mode. The controller 40 may issue commands to allocate an output torque of both the engine 14 and the M/G 20 such that the combination of both output torques satisfies an accelerator pedal 42 input from the driver. The first mode of powertrain operation may be referred to as a "hybrid mode."

The controller 40 may be configured to operate the powertrain 12 in a second mode. The disconnect clutch 18 may isolate the engine 14 from the remainder of the powertrain 12, while operating the powertrain 12 in the second mode. Combustion in the engine 14 may be disabled or otherwise off during the second mode to conserve fuel. The traction battery 22 may transmit stored electrical energy through power electronics to the M/G 20 such that the M/G 20 acts as the sole power source to propel the vehicle 10.

The controller 40 may issue commands to power electronics such that the M/G 20 is enabled to provide positive or negative torque to the transmission input shaft 24 in the second mode. The second mode of powertrain operation in which the M/G 20 is the sole motive source may be referred to as an "electric mode".

The controller 40 may be configured to operate the powertrain in a third mode. The M/G 20 may be operated to convert kinetic energy from the powertrain 12 during braking events into electric energy that may be stored in the traction battery 22. The M/G 20 rotational energy from spinning of the output shaft 38 through the transmission gear box 28 and is converted into electrical energy for storage in the traction battery 22.

The controller 40 may issue commands to the M/G 20 to selectively apply a drag or negative torque ("regenerative torque") to contribute to vehicle deceleration during a regenerative braking event. The third mode of powertrain operation in which a regenerative torque is applied may be referred to as a "regeneration mode".

The M/G 20 may receive input torque from the wheels through the transmission gear box 28 and generate electricity to recharge the traction battery 22 and recover energy that would otherwise be lost as heat during friction braking. The controller 40 may be configured to reduce the commanded regenerative brake torque in response to at least one of the traction battery state of charge falling below a threshold, a traction battery charging or discharging limit being exceeded, and a M/G 20 speed or torque limit being exceeded. The apportionment of wheel braking torque between friction braking torque and regenerative braking torque may be calculated and coordinated by the controller 40 to provide a desired total braking torque to satisfy the driver brake request.

Near the conclusion of a regenerative braking event as the vehicle 10 slows to a speed less than a threshold or comes to a stop, the regenerative braking torque supplied by the M/G 20 may be transferred to the friction braking system 50 to avoid a surge in torque when the torque converter bypass clutch disengages.

The vehicle 10 or powertrain 12 operating modes, e.g. hybrid mode, electric mode, regeneration mode, may have an associated transmission shift schedule that determines an appropriate transmission gear ratio, relating vehicle speed and the rotational speed of M/G 20. The transmission gear ratio may determine a relationship between vehicle speed and engine speed if disconnect clutch 18 is engaged. The controller 40 may schedules transmission shifts in order to optimize the speeds of M/G 20 and engine 14 for current operating mode. A transmission gear ratio may be selected that ensures that M/G 20 and engine 14 are capable of generating sufficient power when power demand associated with an accelerator pedal position is greater than a threshold or anticipated to soon become high. A transmission gear ratio may be selected that optimizes the efficiency of M/G 20 and/or engine 14 when power demand associated with an accelerator pedal position is less than a threshold or anticipated to soon become low. Different shift schedules may be utilized in hybrid mode, electric mode, or regeneration mode. The transmission shift schedule associated with the regeneration mode, e.g. when the driver is applying the brakes to slow down, may optimize the amount of power recovered by M/G 20 and provided to the traction battery 22.

Figure 2:
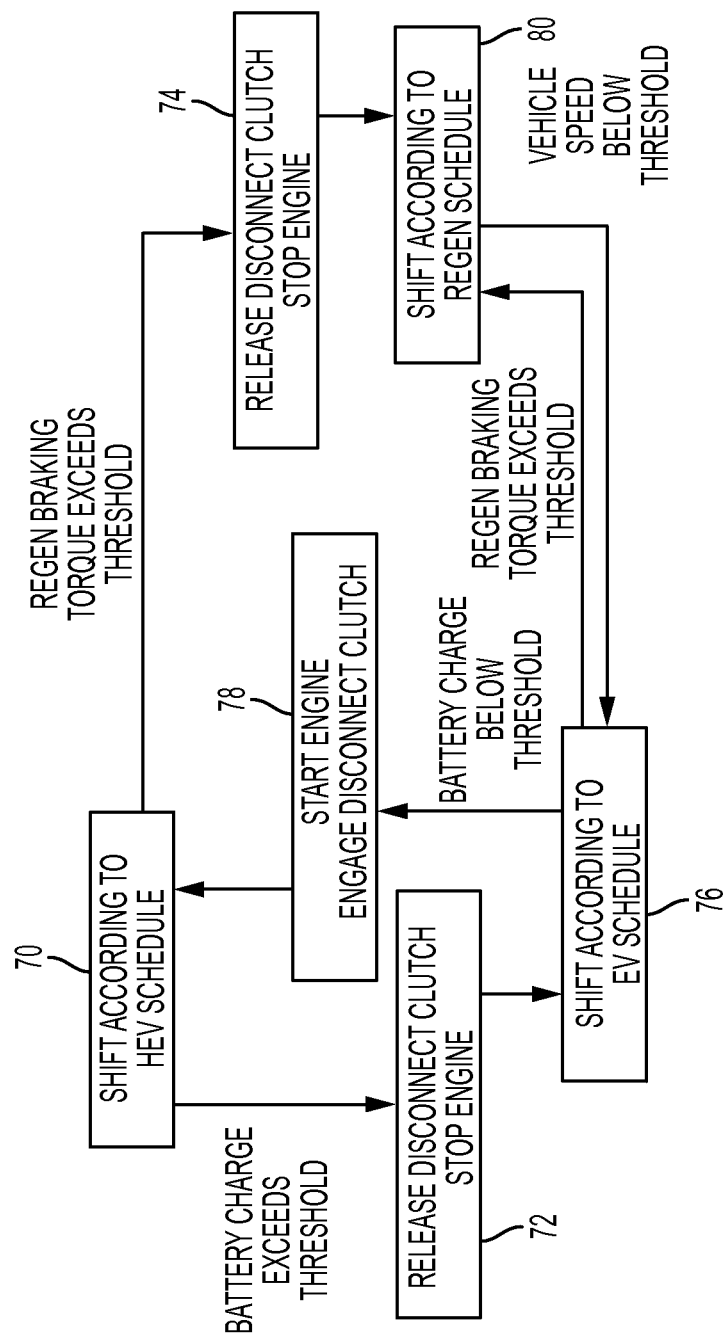
FIG. 2 is a flow chart describing transitions among a set of shift schedules.

FIG. 2 illustrates exemplary transitions between transmission shift schedules. For example, as the vehicle 10 is operating in hybrid mode while the engine 14 is operatively connected to the M/G 20 by the disconnect clutch 18, transmission shifts may be scheduled according to a hybrid mode shift schedule as indicated at block 70. Various conditions or events may result in a transition to a different operating mode with a different associated transmission shift schedule. For example, if the traction battery state of charge increases above a threshold, a power demand is less than a threshold, an accelerator pedal 42 position (or change in position) greater than a threshold, or a brake pedal 44 position (or change in position) less than a threshold, and a power demand less than a threshold, the controller 40 may transition from the hybrid mode to electric mode by releasing the disconnect clutch 18 and stopping the engine 14 at block 72. As another example, if the braking torque allocated to regenerative braking (as opposed to friction braking) exceeds a threshold or a brake pedal 44 position (or change in position) is greater than a threshold, the vehicle 10 may transition from hybrid mode to a regeneration mode by releasing the disconnect clutch 18 and stopping the engine 14 at block 74.

For example, if the vehicle 10 is operating in electric mode, while the engine 14 is operatively disconnected from the M/G 20, transmission shifts may be scheduled according to an electric mode shift schedule as indicated at block 76. The M/G 20 may be operated more efficiently at higher rotational speeds as compared to the engine 14. The electric mode shift schedule may select a lower number gear ratio (higher speed ratio) than the hybrid mode shift schedule. If the traction battery state of charge (traction battery SOC) decreases below a threshold state of charge (threshold SOC) while operating in electric mode or an accelerator pedal 42 position (or change in position) is greater than a threshold, the vehicle 10 may transition from electric mode to hybrid mode by starting the engine 14 and engaging the disconnect clutch 18 at block 78. If the braking torque allocated to regenerative braking exceeds a threshold or a brake pedal 44 position (or change in position) is greater than a threshold while in electric mode, a transition to regeneration mode may not change the engine 14 running state or disconnect clutch 18 engagement state. The transmission 16 may be scheduled according to a regeneration mode shift schedule as indicated at block 80 while the vehicle 10 is operating in regeneration mode. The vehicle 10 may transition from regeneration mode to electric mode as the vehicle speed drops below a threshold or a brake pedal 44 position (or change in position) is greater than a threshold.

Figure 3:
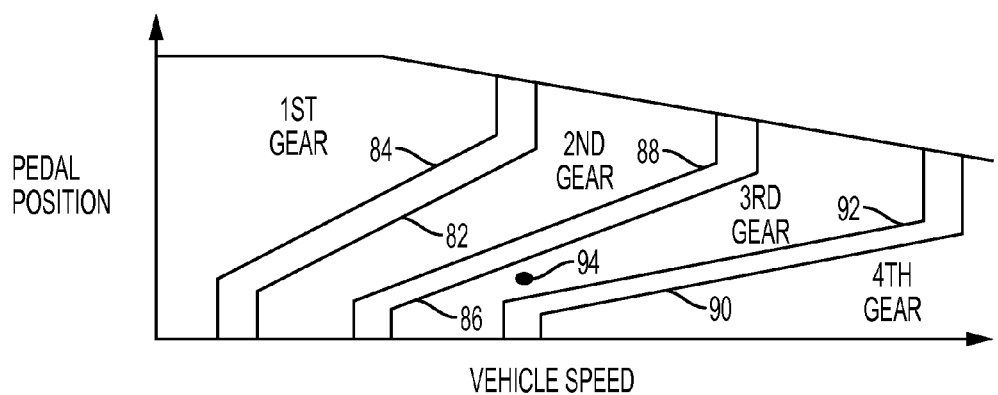
FIG. 3 is a graphical representation of a shift schedule for a hybrid electric operating mode.

FIG. 3 illustrates an exemplary hybrid mode shift schedule for operating the vehicle 10 in hybrid mode. Although the hybrid mode shift schedule of FIG. 3 shows four forward gear ratios, embodiments may employ different numbers of forward gear ratios and reverse gear ratios. The horizontal axis represents vehicle speed and the vertical axis represents accelerator pedal position. The accelerator pedal position may represent a driver demanded power or torque. In some embodiments, the vertical axis may be the driver demand directly. As the current operating condition transitions from the left side of line 82 to the right side of line 82, an upshift from 1st gear to 2nd gear may be scheduled. This may occur as a result of the vehicle speed increasing, as a result of the torque demand decreasing or a decrease in accelerator pedal position, or a combination of the two.

As the operating condition transitions from the right side of line 84 to the left side of line 84, a downshift from 2nd gear to 1st gear may be scheduled. These lines may be spaced apart from one another to avoid excessively frequent shifting between adjacent gears when the operating point varies slightly near a shift transition line. Similarly, lines 86 and 88 control upshifts from 2nd gear to 3rd gear and downshifts from 3rd gear to 2nd gear, respectively. Lines 90 and 92 control upshifts from 3rd gear to 4th gear and downshifts from 4th gear to 3rd gear, respectively. At low torque demand, the hybrid mode shift schedule tends to upshift as the engine speed exceeds a minimum in the higher gear. At high torque demand, upshifts may be delayed until the engine speed reaches a maximum engine speed or the engine 14 would be capable of generating more power in a higher gear (lower speed ratio). The control strategy may include modifiers to account for parameters other than vehicle speed and torque demand, such as acceleration rate or battery state of charge.

Figure 4:
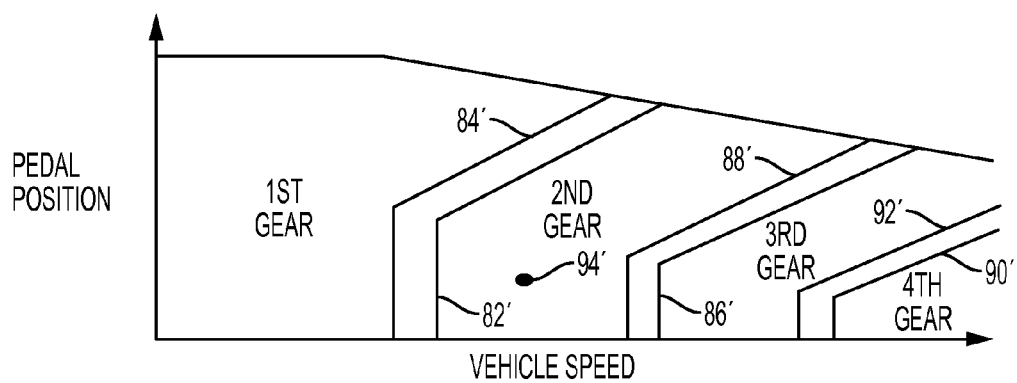
FIG. 4 is a graphical representation of a shift schedule of an electric only operating mode.

FIG. 4 illustrates an exemplary electric mode shift schedule for operating the vehicle 10 in electric mode. Lines 82', 86', and 90' control upshifts from 1st to 2nd, 2nd to 3rd, and 3rd to 4th, respectively. Similarly, lines 84', 88', and 92' control downshifts from 2nd to 1st, 3rd to 2nd, and 4th to 3rd, respectively. These lines may be biased towards higher vehicle speeds than the corresponding lines in FIG. 3. This may result due to the increased efficiency of the M/G 20 at higher rotational speeds, making lower numbered transmission gear ratios more desirable when engine 14 is disconnected from the M/G 20. As the vehicle 10 changes from hybrid mode to electric mode while operating at point 94, unless precautions are taken, the vehicle 10 may shift from 3rd gear to 2nd gear. Since neither accelerator pedal position nor vehicle speed has changed, the driver may not expect a transmission gear ratio shift.

A different transmission shift schedule may be utilized during regenerative braking. Like the electric mode, the regenerative braking shift schedule may be optimized to keep the M/G 20 operating at an efficient operating point. For example, the controller 40 may utilize the regenerative braking shift schedule to change the gear ratio, i.e. a downshift, as the M/G 20 approaches the M/G torque limit and the traction battery power limit while vehicle speed is decreasing. The gear ratio change may increase the M/G torque while the M/G speed decreases, while maintaining a substantially constant traction battery output power or M/G output power. Sometimes referred to as "riding the power limits" of at least one of the M/G 20 or the traction battery 22 to keep shifting as the speed drops to avoid the torque limit of the M/G 20. During braking events, the controller 40 may determine the demanded torque, which is negative to decrease the vehicle speed, based on the position of a brake pedal 44. The controller 40 may allocate some of the demanded torque to the friction brake system 50 and some of the demanded torque to the powertrain 12. For example, the friction brake system 50 may be utilized more heavily if the traction battery state of charge is greater than a threshold or during traction control events that require very rapid changes in braking torque. The regenerative braking transmission shift schedule may command multiple step downshifts to avoid needing to command several shifts in rapid succession when the vehicle deceleration rate exceeds a threshold. Since each shift requires some time, single step shifts might result in lower than desired M/G speed even if they were completed in rapid succession.

Each transmission shift schedule associated with an operating mode of the vehicle 10 may attempt to place the engine 14 and/or the M/G 20 in the most efficient or best power operating point for the operating conditions. The changes in transmission shift schedule may occur automatically, without driver intervention or selection. The changes in transmission shift schedule may occur based on the position or change in position of the accelerator pedal 42 or the brake pedal 44 or may be based on an energy management strategy. The energy management strategy may be controlled by the controller 40 and may involve decisions involving engine off or engine on, traction battery charging or traction battery discharging, or powertrain loads.

The controller 40 may transition between the transmission shift schedules by performing a look ahead. The controller 40 may look ahead to a new transmission shift schedule to see what transmission gear ratio is desired based on the current operating conditions. The look ahead may attempt to make decisions to transition between the transmission shift schedules based on the desired transmission gear ratio associated with the new transmission shift schedule and the current transmission gear ratio associated with the current transmission shift schedule. The controller 40 may transition to the new transmission shift schedule, if the desired transmission gear ratio associated with the new transmission shift schedule is substantially similar to or the same as the current transmission gear ratio associated with the current transmission shift schedule. The controller 40 may remain in the current transmission shift schedule and change to the desired transmission gear ratio, if the desired transmission gear ratio associated with the new transmission shift schedule is not the same or different than the current transmission gear ratio associated with the current transmission shift schedule. The transmission gear ratio change may be delayed until after the transmission shift schedule change from the current transmission shift schedule to the new transmission shift schedule based on accelerator pedal position and/or brake pedal position.

The controller 40 may operate the vehicle 10 according to the current transmission shift schedule at least until a driver event occurs such as a change in accelerator pedal position or a change in brake pedal position greater than a predefined amount. This may mitigate or inhibit transmission gear ratio changes to improve occupant comfort even when the operating mode of the vehicle 10 or powertrain 12 may change.

Figure 5A:
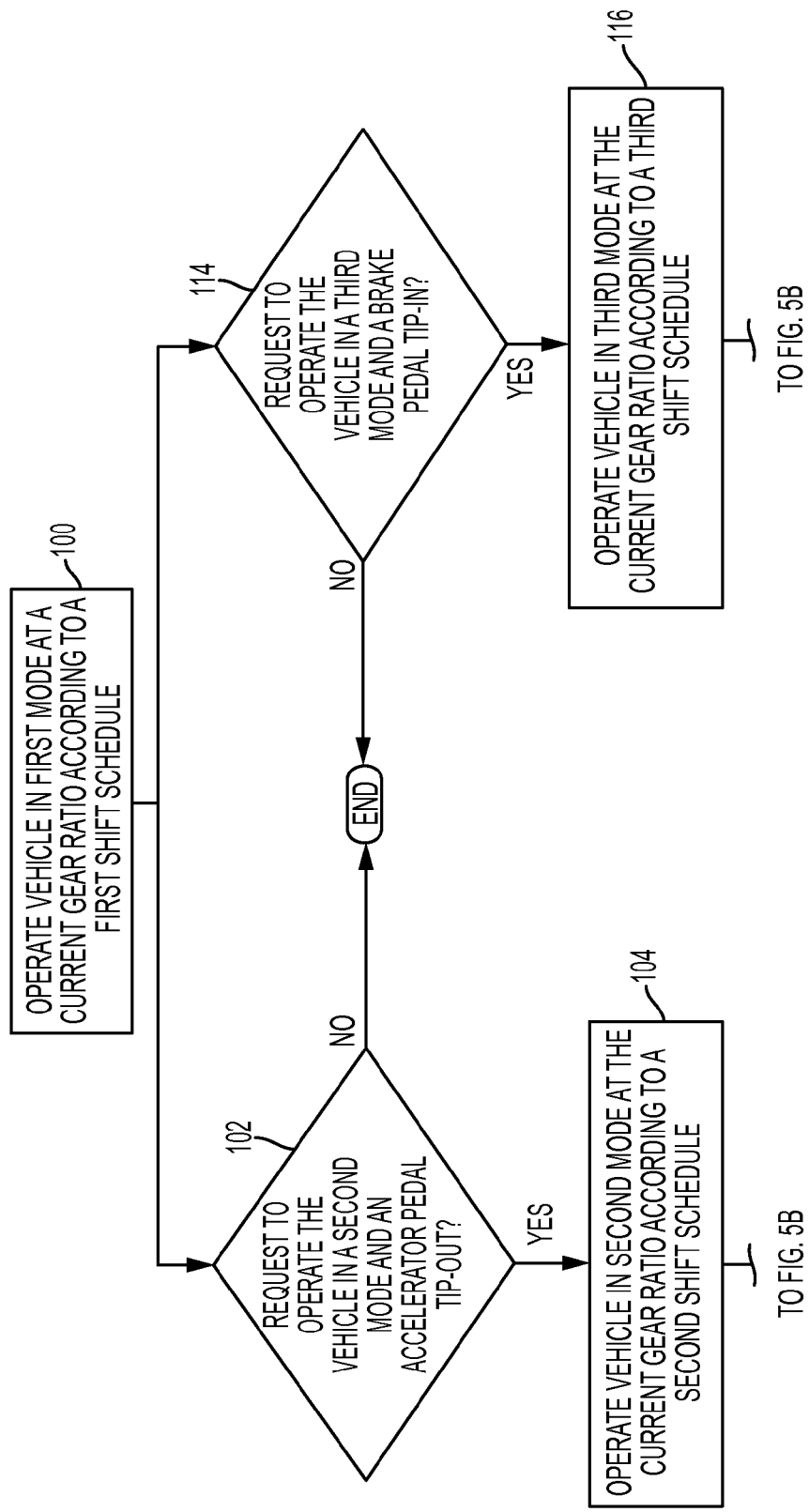
FIGS. 5A and 5B are flow charts illustrating a method of controlling a vehicle.
Figure 5B:
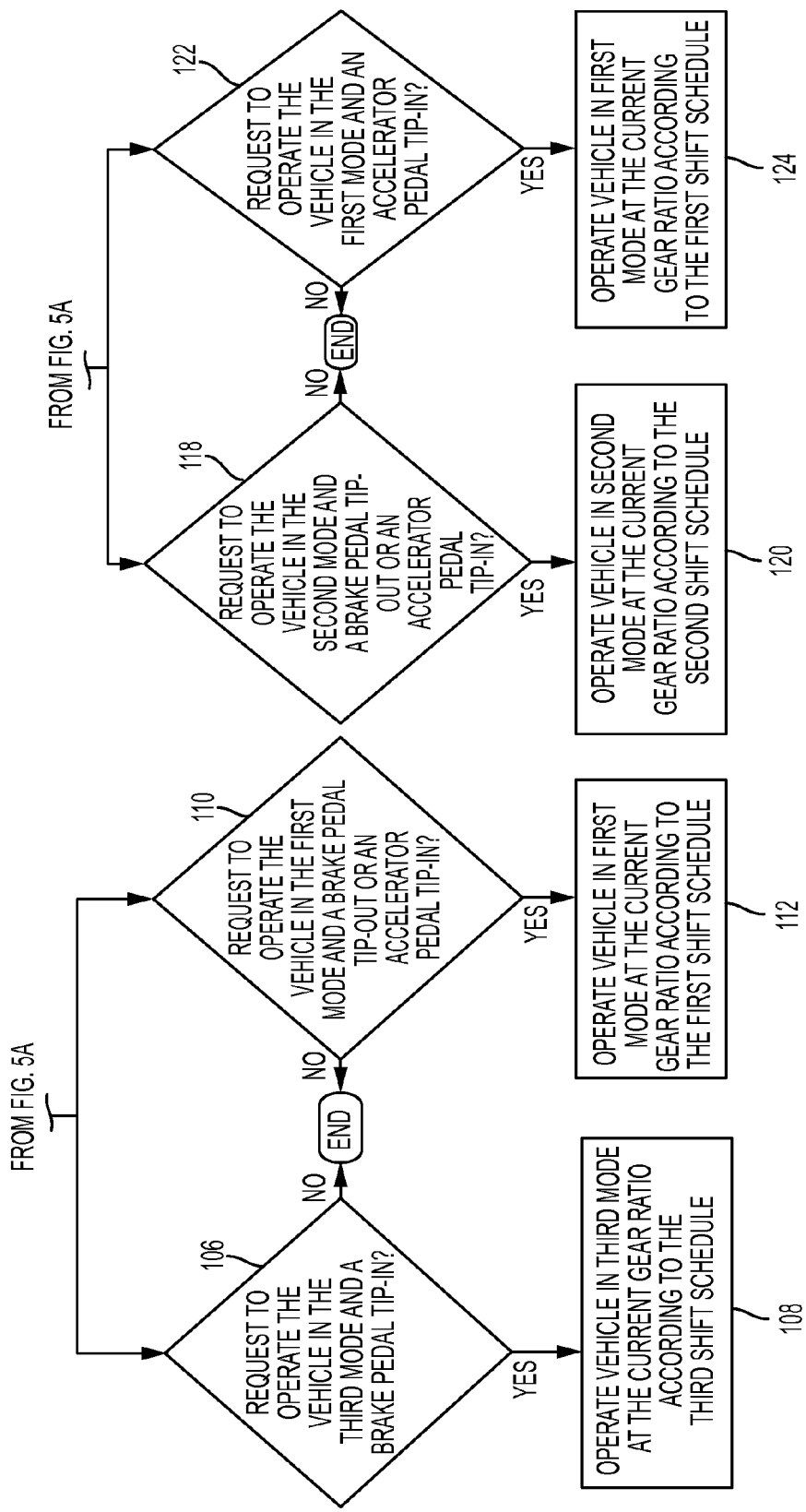

FIGS. 5A and 5B are flow charts illustrating a method of controlling a vehicle. At block 100 the vehicle 10 may be operated in a first mode at a current gear ratio according to a first shift schedule. At block 102 the method may determine if a request to operate the vehicle 10 in a second mode that may be associated with an accelerator pedal tip-out subsequent to an accelerator pedal tip-in has been received. The accelerator pedal tip-out subsequent to the accelerator pedal tip-in may indicate that an operator of the vehicle 10 desired an aggressive acceleration of the vehicle and upon approaching or reaching a desired vehicle speed the operator of the vehicle 10 backed off the accelerator pedal 42 to avoid overshooting or under shooting the desired vehicle speed. In at least one embodiment, the accelerator pedal tip-out may not be associated with the request operate the vehicle 10 in the second mode and the transition from the first mode to the second mode may be commanded asynchronously. The transition from the first mode to the second mode may be commanded asynchronously responsive to a traction battery state of charge exceeding a threshold traction battery state of charge or other powertrain parameter indicating that the operation of the engine 14 may not be required to satisfy the driver demands. Responsive to the request, the method may look ahead to a new gear ratio according to a second shift schedule associated with the second mode. Should the new gear ratio according to the second shift schedule associated with the second mode be the same as or substantially similar to the current gear ratio according to the first shift schedule associated with the first mode, the method may continue to block 104. If the new gear ratio according to the second shift schedule associated with the second mode be different than the current gear ratio according to the first shift schedule associated with the first mode, the method may end. In ending the method, the gear ratio may be changed from the current gear ratio to the new gear ratio while continuing operation of the vehicle 10 in the first mode.

At block 104, the method may maintain the current gear ratio and may operate the vehicle 10 in the second mode at the current gear ratio according to the second shift schedule associated with the second mode. The method may continue to operate the vehicle 10 at the current gear ratio according to the second shift schedule during and following the transition from the first mode to the second mode while a traction battery state of charge is greater than a threshold traction battery state of charge, a decrease in vehicle speed less than a threshold decrease, and an accelerator pedal position falls within a predetermined range. The transmission 16 may not shift away from the current gear ratio while the vehicle speed remains substantially constant, the traction battery state of charge remains greater than a threshold traction battery state of charge, and the accelerator pedal position remains substantially constant or within the predetermined range. In at least one embodiment, the transmission 16 may not shift away from the current gear ratio at least until a vehicle condition changes, such as until an accelerator pedal position changes, the traction battery state of charge changes, or the vehicle speed changes.

At block 106 the method may determine if a request to operate the vehicle 10 in a third mode that may be associated with a brake pedal tip-in less than a threshold. In at least one embodiment, the method may determine if a request to operate the vehicle 10 in a third mode that may be associated with a brake pedal tip-out less than a threshold subsequent to a brake pedal tip-in greater than a threshold has been received, sometimes referred to as "a brake stabber". The brake pedal tip-out subsequent to the brake pedal tip-in may indicate that an operator of the vehicle 10 desired an aggressive deceleration of the vehicle and upon approaching or reaching a desired vehicle speed the operator of the vehicle 10 backed off the brake pedal 44 to avoid overshooting or under shooting the desired vehicle speed. Responsive to the request, the method may look ahead to a new gear ratio according to a third shift schedule associated with the third mode. Should the new gear ratio according to the third shift schedule associated with the third mode be the same as or substantially similar to the current gear ratio according to the second shift schedule associated with the second mode, the method may continue to block 108. If the new gear ratio according to the third shift schedule associated with the third mode be different than the current gear ratio according to the second shift schedule associated with the second mode, the method may end. In ending the method, the gear ratio may be changed from the current gear ratio to the new gear ratio while continuing operation of the vehicle 10 in the second mode.

At block 108, the method may maintain the current gear ratio and may operate the vehicle 10 in the third mode at the current gear ratio according to the third shift schedule associated with the third mode. The method may continue to operate the vehicle 10 at the current gear ratio according to the third shift schedule during and following the transition from the second mode to the third mode while a traction battery state of charge is less than a threshold traction battery state of charge and a brake pedal position remains within a predetermined range. The transmission 16 may not shift away from the current gear ratio while the traction battery state of charge remains less than a threshold traction battery state of charge and the brake pedal position remains substantially constant or within the predetermined range. In at least one embodiment, the transmission 16 may not shift away from the current gear ratio at least until a vehicle condition changes, such as until a brake pedal position changes, the traction battery state of charge changes, or the vehicle speed changes.

Returning to block 104, while the vehicle 10 is operated in the second mode at a current gear ratio according to a second shift schedule the method may await further inputs. At block 110 the method may determine if a request to operate the vehicle 10 in the first mode that may be associated with a brake pedal tip-out greater than a threshold or an accelerator pedal tip-in greater than a threshold. Responsive to the request, the method may look ahead to a new gear ratio according to the first shift schedule associated with the first mode. Should the new gear ratio according to the first shift schedule associated with the first mode be the same as or substantially similar to the current gear ratio according to the second shift schedule associated with the second mode, the method may continue to block 112. If the new gear ratio according to the first shift schedule associated with the first mode be different than the current gear ratio according to the second shift schedule associated with the second mode, the method may end. In ending the method, the gear ratio may be changed from the current gear ratio to the new gear ratio while continuing operation of the vehicle 10 in the second mode.

At block 112, the method may maintain the current gear ratio and may operate the vehicle 10 in the first mode at the current gear ratio according to the first shift schedule associated with the first mode. The method may continue to operate the vehicle 10 at the current gear ratio according to the first shift schedule during and following the transition from the second mode to the first mode while an accelerator pedal position remains within a predetermined range or a brake pedal position remains within a predetermined range. The transmission 16 may not shift away from the current gear ratio while the accelerator pedal position remains substantially constant or the brake pedal position remains substantially constant or within the predetermined range. In at least one embodiment, the transmission 16 may not shift away from the current gear ratio at least until a vehicle condition changes, such as until an accelerator pedal position or brake pedal position changes, the traction battery state of charge changes, or the vehicle speed changes.

Returning to block 100, while the vehicle 10 is operated in the first mode at a current gear ratio according to a first shift schedule the method may await further inputs. At block 114 the method may determine if a request to operate the vehicle 10 in a third mode that may be associated with a brake pedal tip-in less than a threshold. Responsive to the request, the method may look ahead to a new gear ratio according to the third shift schedule associated with the third mode. Should the new gear ratio according to the third shift schedule associated with the third mode be the same as or substantially similar to the current gear ratio according to the first shift schedule associated with the first mode, the method may continue to block 116. If the new gear ratio according to the third shift schedule associated with the third mode be different than the current gear ratio according to the first shift schedule associated with the first mode, the method may end. In ending the method, the gear ratio may be changed from the current gear ratio to the new gear ratio while continuing operation of the vehicle 10 in the second mode.

At block 116, the method may maintain the current gear ratio and may operate the vehicle 10 in the third mode at the current gear ratio according to the third shift schedule associated with the third mode. The method may continue to operate the vehicle 10 at the current gear ratio according to the third shift schedule during and following the transition from the first mode to the third mode while a brake pedal position remains within a predetermined range. The transmission 16 may not shift away from the current gear ratio while the brake pedal position remains substantially constant or within the predetermined range. In at least one embodiment, the transmission 16 may not shift away from the current gear ratio at least until a vehicle condition changes, such as until a brake pedal position changes, the traction battery state of charge changes, or the vehicle speed changes.

At block 118 the method may determine if a request to operate the vehicle 10 in a second mode that may be associated with a brake pedal tip-out or an accelerator pedal tip-in less than a threshold. In at least one embodiment, the method may determine if a request to operate the vehicle 10 in a second mode that may be associated with a brake pedal tip-in greater than a threshold subsequent to a brake pedal tip-in less than a threshold has been received, sometimes referred to as "a brake squeezer". The brake pedal tip-in greater than a threshold subsequent to the brake pedal tip-in less than a threshold may indicate that an operator of the vehicle 10 desired a gradual deceleration of the vehicle and to aid in achieving a desired vehicle speed the operator of the vehicle 10 increased the amount of brake pedal depression to achieve the desired vehicle speed. Responsive to the request, the method may look ahead to a new gear ratio according to a second shift schedule associated with the second mode. Should the new gear ratio according to the second shift schedule associated with the second mode be the same as or substantially similar to the current gear ratio according to the third shift schedule associated with the third mode, the method may continue to block 120. If the new gear ratio according to the third shift schedule associated with the third mode be different than the current gear ratio according to the second shift schedule associated with the second mode, the method may end. In ending the method, the gear ratio may be changed from the current gear ratio to the new gear ratio while continuing operation of the vehicle 10 in the second mode.

At block 120, the method may maintain the current gear ratio and may operate the vehicle 10 in the second mode at the current gear ratio according to the second shift schedule associated with the second mode. The method may continue to operate the vehicle 10 at the current gear ratio according to the second shift schedule during and following the transition from the third mode to the second mode while a traction battery state of charge is greater than a threshold traction battery state of charge and a brake pedal position remains within a predetermined range or an accelerator pedal position remains within a predetermined range. The transmission 16 may not shift away from the current gear ratio while the traction battery state of charge remains greater than a threshold traction battery state of charge and the brake pedal position remains within a predetermined range or an accelerator pedal position remains within a predetermined range. In at least one embodiment, the transmission 16 may not shift away from the current gear ratio at least until a vehicle condition changes, such as until an accelerator pedal position or a brake pedal position changes, the traction battery state of charge changes, or the vehicle speed changes.

Returning to block 116, while the vehicle 10 is operated in the third mode at a current gear ratio according to a third shift schedule the method may await further inputs. At block 122 the method may determine if a request to operate the vehicle 10 in the first mode that may be associated with an accelerator pedal tip-in greater than a threshold. Responsive to the request, the method may look ahead to a new gear ratio according to the first shift schedule associated with the first mode. Should the new gear ratio according to the first shift schedule associated with the first mode be the same as or substantially similar to the current gear ratio according to the third shift schedule associated with the third mode, the method may continue to block 124. If the new gear ratio according to the first shift schedule associated with the first mode be different than the current gear ratio according to the third shift schedule associated with the third mode, the method may end. In ending the method, the gear ratio may be changed from the current gear ratio to the new gear ratio while continuing operation of the vehicle 10 in the third mode.

At block 124, the method may maintain the current gear ratio and may operate the vehicle 10 in the first mode at the current gear ratio according to the first shift schedule associated with the first mode. The method may continue to operate the vehicle 10 at the current gear ratio according to the first shift schedule during and following the transition from the third mode to the first mode while an accelerator pedal position remains within a predetermined range. The transmission 16 may not shift away from the current gear ratio while the accelerator pedal position remains substantially constant or within the predetermined range. In at least one embodiment, the transmission 16 may not shift away from the current gear ratio at least until a vehicle condition changes, such as until an accelerator pedal position changes, the traction battery state of charge changes, or the vehicle speed changes.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
an engine;
a transmission configured to be selectively coupled to the engine; and
a controller programmed to, responsive to a request to decouple the engine from the transmission received while a traction battery state of charge (SOC) is greater than a threshold SOC, to a decrease in vehicle speed less than a threshold decrease, and to an accelerator pedal position being within a predetermined range, command the transmission to maintain a current gear ratio such that following decoupling of the engine from the transmission, the transmission does not shift while the vehicle speed remains substantially constant and the SOC remains greater than the threshold SOC.

2. The vehicle of claim 1, wherein the controller is further programmed to, while the engine remains decoupled from the transmission, delay shifting the transmission to a new gear ratio at least until a brake pedal position changes more than a predefined amount.

3. The vehicle of claim 2, wherein the controller is further programmed to, responsive to a decrease in brake pedal position, command the transmission to maintain the current gear ratio.

4. The vehicle of claim 1, wherein the controller is further programmed to, responsive to a request to decouple the engine from the transmission and to an increase in brake pedal position greater than a threshold, command the transmission to maintain the current gear ratio such that following decoupling of the engine from the transmission, the transmission does not shift at least until a brake pedal position changes.

5. The vehicle of claim 1, wherein the controller is further programmed to, responsive to a request to decouple the engine from the transmission received while the SOC is less than the threshold SOC and to a decrease in vehicle speed less than the threshold decrease, command the transmission to shift to a new gear ratio and command the transmission to maintain the coupling to the engine.

6. The vehicle of claim 1 wherein the controller is further programmed to, responsive to a request to couple the engine to the transmission and to an increase in accelerator pedal position greater than a threshold, command the transmission to maintain the current gear ratio such that following coupling of the engine to the transmission, the transmission does not shift at least until an accelerator pedal position changes.

7. A vehicle comprising:
a controller programmed to
operate a powertrain in hybrid mode, and
responsive to a request to operate the powertrain in electric mode, transition powertrain operation from the hybrid mode to the electric mode without shifting gears until a change in accelerator pedal position exceeds a threshold following the transition.

8. The vehicle of claim 7 wherein the controller is further programmed to, responsive to a request to operate the powertrain in a regeneration mode and to a brake pedal tip-in while operating the powertrain in the electric mode, transition powertrain operation from the electric mode to the regeneration mode without shifting gears until a change in brake pedal position exceeds a threshold following the transition.

9. The vehicle of claim 8 wherein the controller is further programmed to, responsive to a request to operate the powertrain in the hybrid mode and to a brake pedal tip-out while operating the powertrain in the regeneration mode, transition powertrain operation from the regeneration mode to the hybrid mode without shifting gears until a change in at least one of a brake pedal position and an accelerator pedal position exceeds a threshold following the transition.

10. The vehicle of claim 8 wherein the controller is further programmed to, responsive to a request to operate the powertrain in the hybrid mode and to an accelerator pedal tip-in greater than a threshold while operating the powertrain in the electric mode, transition powertrain operation from the electric mode to the hybrid mode without shifting gears until a change in accelerator pedal position exceeds a threshold following the transition.

11. The vehicle of claim 8 wherein the controller is further programmed to, responsive to a request to operate the powertrain in the electric mode and to a brake pedal tip-out while operating the powertrain in the regeneration mode, transition powertrain operation from the regeneration mode to the electric mode without shifting gears until a change in brake pedal position exceeds a threshold following the transition.

12. The vehicle of claim 8 wherein the controller is further programmed to, responsive to a request to operate the powertrain in the electric mode and to an accelerator pedal tip-in while operating the powertrain in the regeneration mode, transition powertrain operation from the regeneration mode to the electric mode without shifting gears until a change in accelerator pedal position exceeds a threshold following the transition.

13. A powertrain control method comprising:
operating a powertrain in a hybrid mode at a first gear ratio; and
responsive to a request to operate the powertrain in an electric mode associated with an accelerator pedal tip-out while a traction battery state of charge (SOC) is greater than a threshold SOC, transitioning operation of the powertrain from the hybrid mode to the electric mode while maintaining the first gear ratio until an accelerator pedal position changes.

14. The method of claim 13 further comprising, responsive to a request to operate the powertrain in a regeneration mode associated with a brake pedal tip-in less than a threshold while operating the powertrain in the hybrid mode at the first gear ratio, transitioning operation of the powertrain from the hybrid mode to the regeneration mode while maintaining the first gear ratio until a brake pedal position changes.

15. The method of claim 14 further comprising, responsive to a request to operate the powertrain in the hybrid mode associated with a brake pedal tip-out less than a threshold while operating the powertrain in the regeneration mode at a third gear ratio, transitioning operation of the powertrain from the hybrid mode to the regeneration mode while maintaining the third gear ratio until a brake pedal position changes.

16. The method of claim 14 further comprising, responsive to a request to operate the powertrain in the hybrid mode associated with an accelerator pedal tip-in greater than a threshold, while operating the powertrain in the regeneration mode at a third gear ratio, transitioning operation of the powertrain from the regeneration mode to the hybrid mode while maintaining the third gear ratio until an accelerator pedal position changes.

17. The method of claim 14 further comprising, responsive to a request to operate the powertrain in a regeneration mode associated with a brake pedal tip-in less than a threshold, while operating the powertrain in the electric mode at a second gear ratio, transitioning operation of the powertrain from the electric mode to the regeneration mode while maintaining the second gear ratio until a brake pedal position changes.

\* \* \* \* \*